United States Patent [19]
Willcox

[11] Patent Number: 5,665,899
[45] Date of Patent: Sep. 9, 1997

[54] PRESSURE SENSOR DIAGNOSTICS IN A PROCESS TRANSMITTER

[75] Inventor: Charles R. Willcox, Eden Prairie, Minn.

[73] Assignee: Rosemount Inc., Eden Prairie, Minn.

[21] Appl. No.: 605,941

[22] Filed: Feb. 23, 1996

[51] Int. Cl.$^6$ .................................................. G01F 1/38
[52] U.S. Cl. ........................................................ 73/1.63
[58] Field of Search .......................... 73/4 R, 4 D, 4 V, 73/1 B, 1 D, 724

[56] References Cited

U.S. PATENT DOCUMENTS

| | | | |
|---|---|---|---|
| 3,405,559 | 10/1968 | Moffatt | 73/398 |
| 3,743,552 | 7/1973 | Fa | 148/175 |
| 4,084,438 | 4/1978 | Lee et al. | 73/706 |
| 4,088,799 | 5/1978 | Kurtin | 427/38 |
| 4,196,632 | 4/1980 | Sikorra | 73/718 |
| 4,287,501 | 9/1981 | Tominaga et al. | 338/42 |
| 4,301,492 | 11/1981 | Paquin et al. | 361/283 |
| 4,434,665 | 3/1984 | Adolfsson et al. | 73/724 |
| 4,507,973 | 4/1985 | Barr et al. | 73/724 |
| 4,542,436 | 9/1985 | Carusillo | 361/283 |
| 4,544,887 | 10/1985 | Kamieniecki | 324/158 |
| 4,753,109 | 6/1988 | Zabler | 73/115 |
| 4,761,607 | 8/1988 | Shiragasawa et al. | 324/158 |
| 4,800,758 | 1/1989 | Knecht et al. | 73/727 |
| 4,825,685 | 5/1989 | Breimesser | 73/4 R |
| 4,836,011 | 6/1989 | Dombrowski et al. | 73/4 R |
| 4,837,506 | 6/1989 | Patterson | 324/158 |
| 4,859,939 | 8/1989 | Gittleman et al. | 327/158 |
| 4,896,525 | 1/1990 | Breimesser | 73/4 R |
| 4,972,717 | 11/1990 | Southworth et al. | 73/724 |
| 5,155,061 | 10/1992 | O'Connor et al. | 437/86 |
| 5,178,015 | 1/1993 | Loeppert et al. | 73/718 |
| 5,201,228 | 4/1993 | Kojima et al. | 73/724 |
| 5,227,068 | 7/1993 | Runyon | 210/610 |
| 5,287,724 | 2/1994 | White et al. | 73/1 D |
| 5,326,726 | 7/1994 | Tsang et al. | 437/228 |
| 5,332,469 | 7/1994 | Mastrangelo | 156/643 |
| 5,349,492 | 9/1994 | Kimura et al. | 361/283.4 |
| 5,377,524 | 1/1995 | Wise et al. | 73/4 R |
| 5,381,300 | 1/1995 | Thomas et al. | 361/280 |
| 5,424,650 | 6/1995 | Frick | 324/688 |

(List continued on next page.)

FOREIGN PATENT DOCUMENTS

| | | |
|---|---|---|
| 0 351 701 B1 | 6/1993 | European Pat. Off. . |
| 3404262A1 | 9/1984 | Germany . |
| Sho 49-38911 | 4/1974 | Japan . |
| 62-259475 | 11/1987 | Japan . |
| 63-285195 | 11/1988 | Japan . |
| 311556 | 4/1990 | Japan . |
| Hei 6-300650 | 10/1994 | Japan . |
| 1069435 | 5/1967 | United Kingdom . |

OTHER PUBLICATIONS

L. Shipu, F. Donghui, X. Ning, S. Zhenya and C. Xiaoming, *Processing of Advanced Materials*, "Surface electrical properties of Ni-implanted sapphire", published by Chapman & Hall, pp. 77–80 (1991).

L. Romana, P. Thevenard, B. Canut, G. Massouras and R. Brenier, *Nuclear Instruments and Methods in Physics Research B46*, "Phase Formation Study in $\alpha$-Al$_2$O$_3$ Implanted With Niobium Ions", published by Elsevier Science Publishers B.V. (North-Holland), pp. 94–97 (1990).

(List continued on next page.)

*Primary Examiner*—Robert Raevis
*Attorney, Agent, or Firm*—Westman, Champlin & Kelly, P.A.

[57] ABSTRACT

A transmitter in a process control system includes diagnostic circuitry for determining condition of a pressure sensor. The pressure sensor includes a pressure responsive structure and a capacitor coupled to the pressure responsive structure whereby capacitance of the capacitor varies in response to process pressure. Measurement circuitry determines capacitance which is transmitted over a process control loop using output circuitry. The diagnostic circuitry is coupled to the pressure sensor and provides a diagnostic input to the pressure sensor. The diagnostic input causes a change in the capacitance which is monitored to determine condition of the pressure sensor.

17 Claims, 4 Drawing Sheets

U.S. PATENT DOCUMENTS

| | | | |
|---|---|---|---|
| 5,437,189 | 8/1995 | Brown et al. | 73/721 |
| 5,445,006 | 8/1995 | Allen et al. | 73/1 D |
| 5,469,735 | 11/1995 | Watanabe | 73/118.1 |
| 5,471,884 | 12/1995 | Czarnocki et al. | 73/720 |

OTHER PUBLICATIONS

"High–Temperature Healing of Lithographically Introduced Cracks in Sapphire", J. Rödel and A.M. Glaeser, *J. Am. Ceram. Soc.*, vol. 73, No. 3, Mar. 1990, pp. 592–601.

"A Balanced Resonant Pressure Sensor", E. Stemme and G. Stemme, *Sensors and Actuators*, A21–A23, 1990, pp. 336–341.

"Silicon Microcavities Fabricated with a New Technique", L. Tenerz and B. Hök, *Electronics Letters*, vol. 22, No. 11, May 22, 1986, pp. 615–616.

"Small sensitive pressure transducer for use at a low temperature", W. Griffioen and G. Frossati, *Rev. Sci. Instrum.*, vol. 56, No. 6, Jun. 1985, pp. 1236–1238.

"Low–Temperature Preparation of Silicon/Silicon Interfaces by the Silicon–to–Silicon Bonding Method", S. Bengtsson and O. Engström, *J. Electrochem. Soc.*, vol. 137, No. 7, Jul. 1990, pp. 2297–2303.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicon–on–insulator technologies", J.B. Lasky, *Appl. Phys. Lett.*, vol. 48, No. 1, Jan. 1, 1986, pp. 78–80.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172–C–175.

"Fabrication of an Implantable Capacitive Type Pressure Sensor", S. Shoji, T. Nisase, M. Esashi and T. Matsuo, *Transducers '87*, 1987.

"Creep of Sensor's Elastic Elements: Metals versus Nonmetals", K. Bethe, d. Baumgarten and J. Frank, *Nova Sensor—Silicon Sensors and Microstructure*, 1990, pp. 844–849.

"Silicon–to–silicon direct bonding method", M. Shimbo, K. Furukawa, K. Fukuda and K. Tanzawa, *J. Appl. Phys.*, vol. 60, No. 8, Oct. 15, 1986, pp. 2987–2989.

"Silicon Sensors and Microstructure", J. Brysek, K. Petersen, J. Mallon, Jr., L. Christel, F. Pourahmadi, *Nova Sensor*, Jun. 1990, pp. 5.4–5.8, 8.21–8.23, 9.9–9.10, 9.13–9.15.

PRESSURE SENSOR DIAGNOSTICS IN A PROCESS TRANSMITTER

BACKGROUND OF THE INVENTION

The present invention relates to the process control industry. More specifically, the present invention relates to diagnostics of pressure sensors of a type for use in the process control industry to measure pressure of a process fluid.

Pressure transmitters are used in the process control industry to measure pressure of a process at a remote location and transmit pressure information over a two-wire process control loop to a control room where the process is controlled. The transmitter includes a pressure sensor which is used for sensing an absolute or differential pressure of the process. Differential pressure is used, for example, to measure process flow by monitoring the change in pressure across a constriction.

As the pressure sensors are exposed to a harsh working environment, their accuracy tends to degrade over time. Thus, to maintain accurate pressure measurements, it is necessary to periodically replace or calibrate the sensor. Calibration requires an operator to enter the field, remove the pressure sensor and apply a test pressure. This is time consuming, dangerous and may require the process to be shut down during calibration. A pressure transmitter capable of performing diagnostics on a pressure sensor without requiring the transmitter to be taken off line and disconnected from the process would be a useful contribution to the process control industry.

SUMMARY OF THE INVENTION

A transmitter in a process control system is capable of performing diagnostics on a pressure sensor. The transmitter includes a pressure sensor having a pressure responsive structure for receiving a pressure of the process and, in one embodiment, a capacitor coupled to the pressure responsive structure such that the capacitance changes in response to the process pressure. Measurement circuitry measures the capacitance which is transmitted over a process control loop using output circuitry. Diagnostic circuitry is coupled to the pressure sensor and performs diagnostics on the pressure sensor by providing a diagnostic input to the pressure sensor. The diagnostic circuitry monitors the change in capacitance as determined by the measurement circuitry in response to the diagnostic input. Based upon the change in capacitance, a determination is made regarding the condition of the pressure sensor.

DETAILED DESCRIPTION OF THE PREFERRED EMBODIMENTS

The present invention provides a process controlled transmitter capable of performing diagnostics on a pressure sensor. The invention is particularly useful for sensors made of brittle materials. Suitable materials include ceramics, sapphire, silicon, quartz, ruby and diamond.

Figure 1:
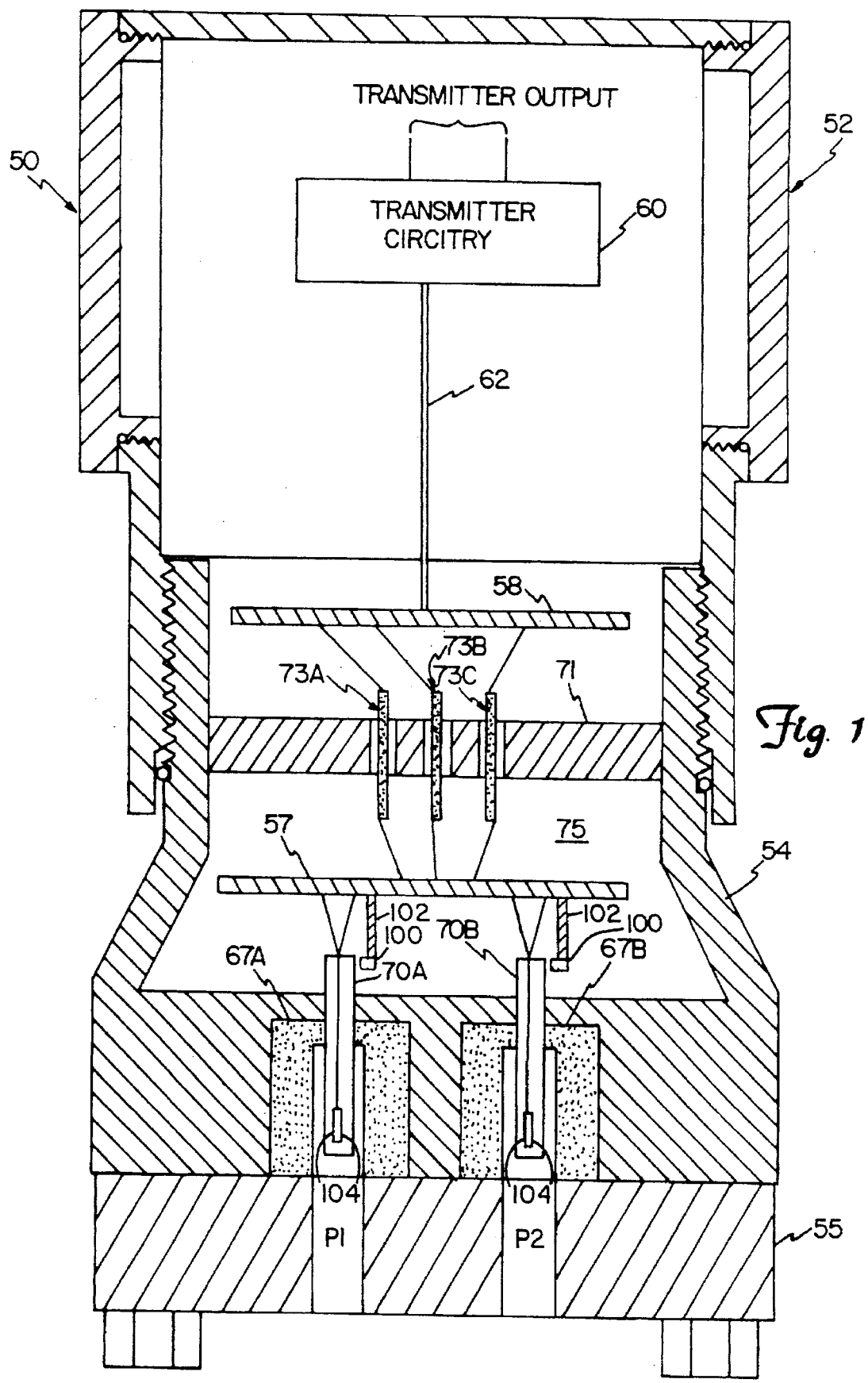
FIG. 1 is a cross sectional view showing a transmitter including diagnostic circuitry in accordance with the present invention.
Figure 2:
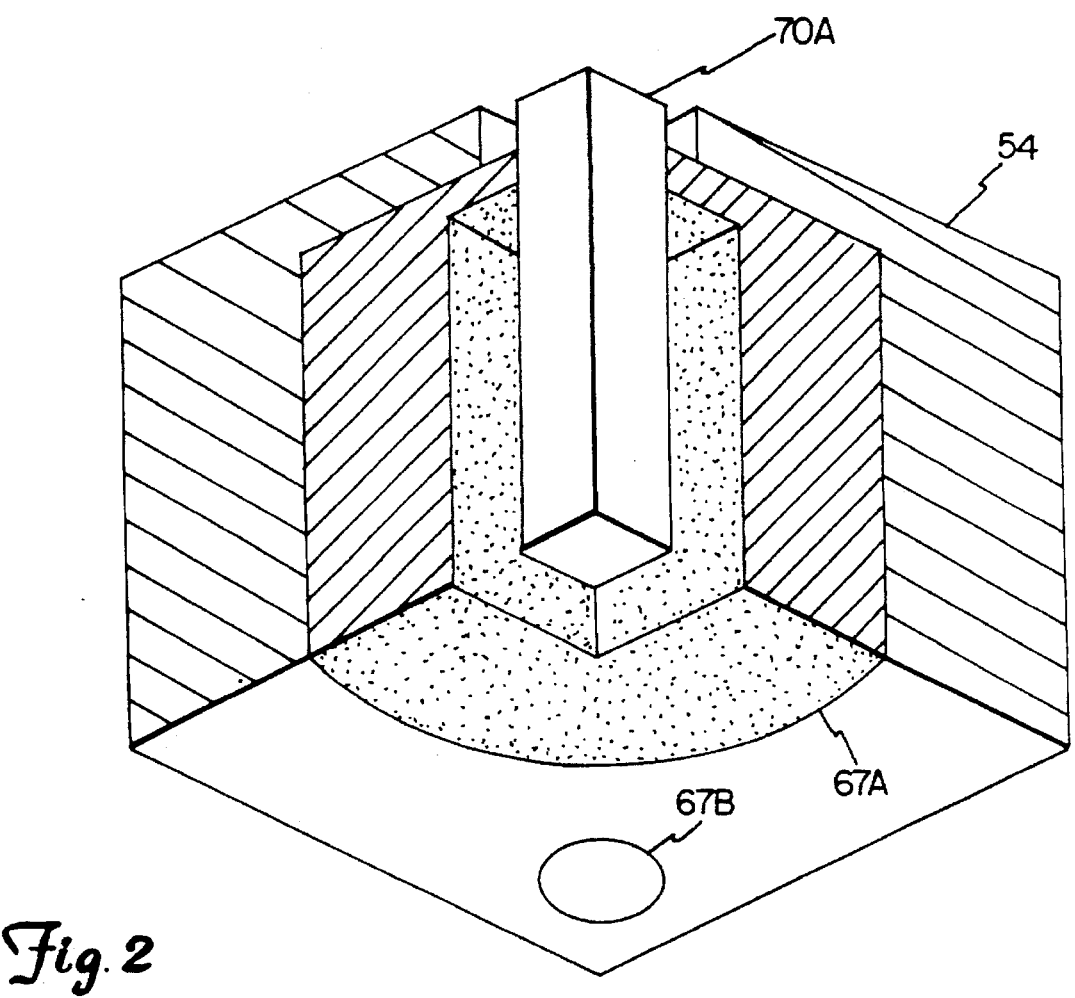
FIG. 2 is a cut away perspective view showing a sensor of a type for use in the invention.

FIG. 1 shows pressure transmitter 50 having transmitter body 52, sensor body 54 and flange 55. Sensor body 54 includes pressure sensors 70A and 70B which measure absolute pressure P1 and absolute pressure P2, respectively, of process fluid. Transmitter body 52 includes transmitter (I/O) circuitry 60 which sends information related to pressures P1 and P2 over a two-wire process control loop, such as a 4–20 mA current loop. Circuit board 57 couples sensor circuit board 58 to sensors 70A and 70B and receives electrical signals related to pressures P1 and P2. Circuitry on sensor circuit board 58 digitized and processes these signals, and communicates pressure information to transmitter circuitry 60 using data bus 62. Inserts 67A and 67B carry sensors 70A and 70B. A process barrier 71 forms cavity 75 and prevents pressures P1 and P2 from escaping sensor body 54 should insert 67A or 67B fail. Cavity 75 may be a vacuum or filled with an inert gas. Feed-throughs 73A, 73B and 73C provide electrical pathways across barrier 71 between circuit boards 57 and 58. FIG. 2 is a cut-away perspective view of insert 67A which carries sensor 67A. In one embodiment, insert 70A comprises alumina.

The present invention is for use with a pressure sensor formed of a brittle material. One embodiment uses a pressure sensing structure formed of a single crystal material and the joints can be formed using fusion bonding such that they are substantially free of foreign materials which could lead to inaccuracies. The structure may be surrounded by process fluid which applies pressure to the structure. This is possible because the structure is formed of a corrosion resistant material. The sensor, comprised of brittle material, is deformed by compression which provides a higher ratio of working stress-to-error stress and therefore a higher signal-to-noise ratio. This results because brittle materials are stronger in compression than in tension. This configuration causes the sensor to be less sensitive to corrosion. Placement of the structure in the process fluid improves reliability because the isolation diaphragms and oil fill are eliminated. An elongated shaft provides stress isolation and is formed of the same single crystal material to help reduce stress transmitted errors. Electrical leads are provided through the elongated shaft and isolated from process fluid. A path through the shaft can also be used to apply a reference pressure.

As sensor technology has progressed, transmitters are able to provide increasing accuracy in their measurements. This increased accuracy requires better and more accurate diagnostic techniques. The present invention provides an accurate technique for diagnosing a pressure sensor. In the present invention, a diagnostic input is applied to the pressure sensor. The diagnostic input causes the output of the pressure sensor to change. This change is monitored and used to determine the condition of the sensor. In FIG. 1, light sources 100 are mounted on supports 102 adjacent to sensors 70A and 70B. It has been discovered that upon illuminating sensors 70A and 70B with radiation light from light sources 100, the output from sensors 70A and 70B changes. More specifically, if pressure sensors 70A and 70B contain capacitive plates 104 and pressure is determined by measuring the capacitance between plates 104, an increase in capacitance occurs when sensors 70A and 70B are illuminated. Preferably, the positioning and intensity of light sources 100 is such that radiation from sources 100 reaches plates 104. Furthermore, this phenomenon has been observed to be proportional to the level of vacuum between plates 104. The effect decreases with a decreasing vacuum level. The invention provides a technique to directly evaluate a reference vacuum in an absolute pressure sensor. The change in capacitance is quite small, on the order of 100 aF, requiring sensitive measurement electronics. This embodiment is particularly well suited for determining loss of vacuum in a pressure sensor.

Figure 3:
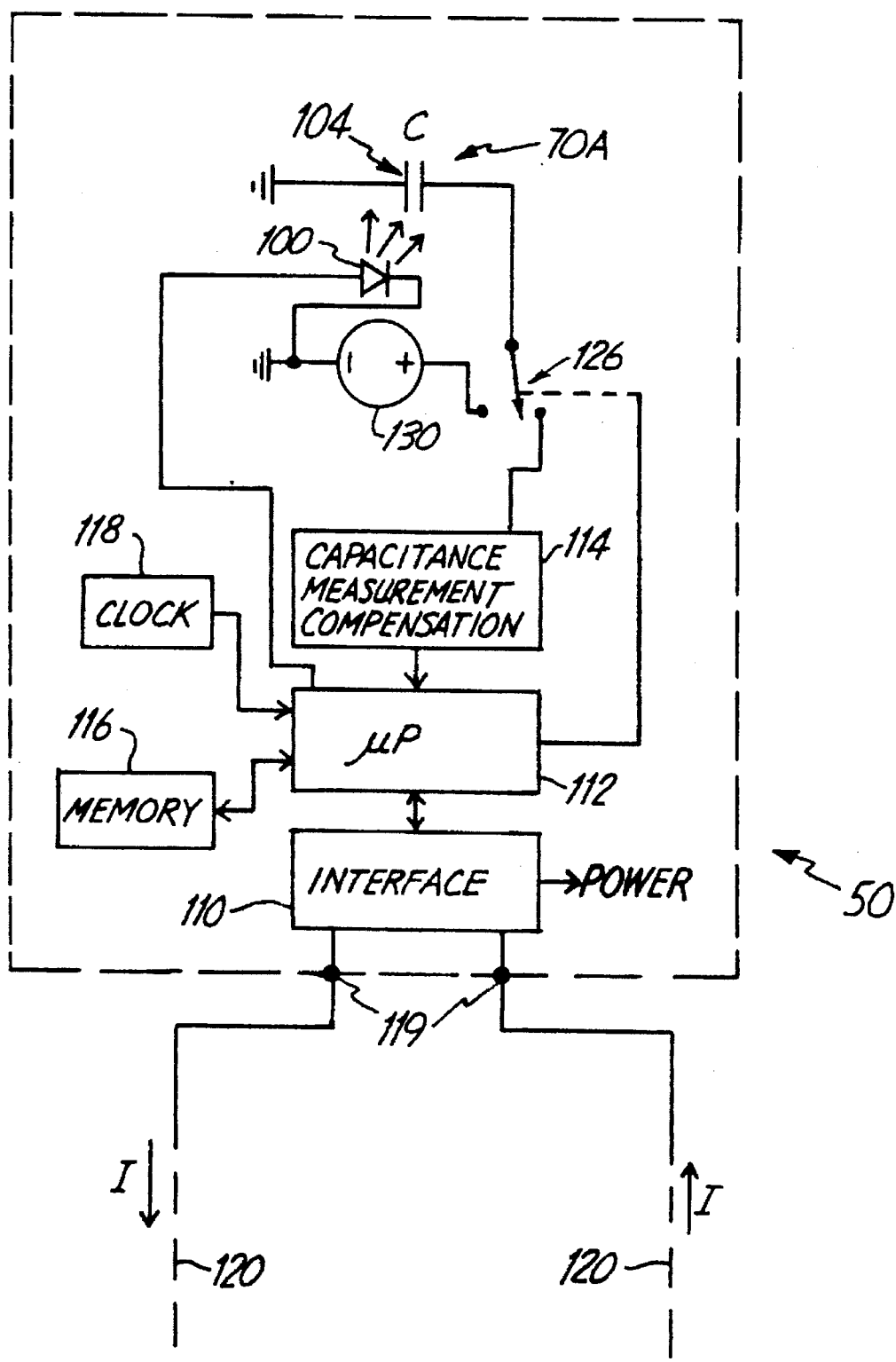
FIG. 3 is a block diagram showing circuitry used in the transmitter of FIG. 1 including diagnostic circuitry in accordance with the present invention.

FIG. 3 shows circuitry in transmitter 50 in accordance with one embodiment of the invention. Transmitter 50 includes interface circuitry 110, microprocessor 112 and capacitance measurement/compensation circuitry 114. Microprocessor 112 couples to interface 110 and is also connected to memory 116 and system clock 118. FIG. 3 shows microprocessor 112 coupled to light source 100 in accordance with one embodiment. Light source 100 may comprise, for example, a light emitting diode (LED).

In operation, transmitter 50 couples to process control loop 120 which carries a loop current I. Typically, process control loop is connected to equipment located in a control room while transmitter 50 is located in the field for remotely sensing the process. Interface circuitry 110 couples to loop 120 at terminals 119 and provides a power output generated using current I which is used to power a transmitter 50. Capacitance measurement/compensation circuitry 114 measures the capacitance between plates 104 of sensor 70A (and 70B which is not shown in FIG. 3). Variations in errors in the capacitance are compensated using circuitry 114 which provides a pressure output representative of process pressure to microprocessor 112. Microprocessor 112 operates in accordance with instructions stored in memory 116 at a speed determined by system clock 118. Microprocessor 112 determines a process variable such as process flow or product height based upon the pressure output from circuitry 114. Microprocessor 112 provides the process variable to interface 110 which formats the information for transmission on loop 120. Loop 120 may operate in accordance with any of the communication protocols used in the process control industry. For example, the process variable can be transmitted by controlling loop current I between a zero level represented by a 4 mA signal and a full scale level represented by a 20 mA current level. Simultaneously or in an alternative, digital information can be sent on loop 120 using any known digital transmission technique such as that described in the HART® communication protocol or the Fieldbus protocol. Typically, measurement circuitry 114 resides on board 58 while microprocessor 112, interface 110, memory 116 and clock 118 are located in transmitter circuitry 60 in FIG. 1. Additionally, circuitry 114 includes an analog-to-digital converter.

Figure 4:
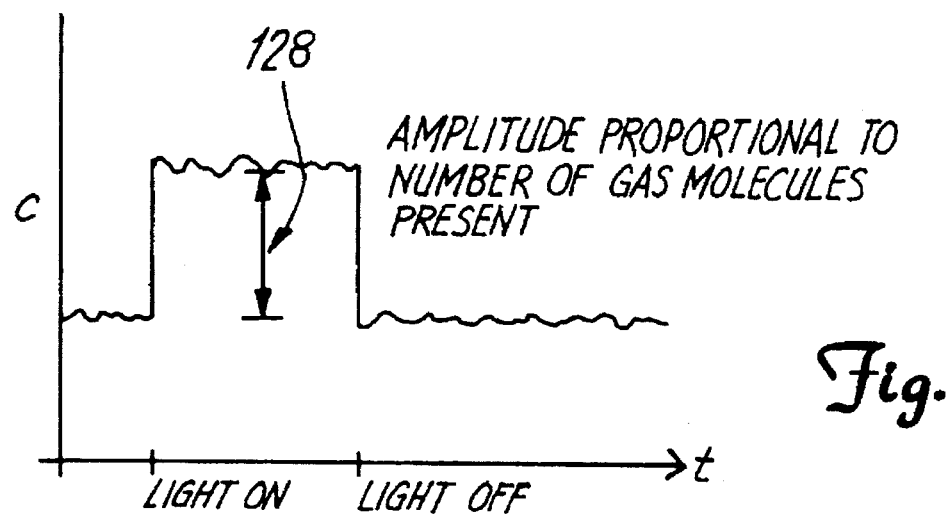
FIG. 4 is a graph showing capacitance versus time in accordance with one embodiment.

In accordance with one embodiment, light source 100 is shown coupled to microprocessor 112. However, source 100 may operate under the control of circuitry 114 or under the control of a separate diagnostic circuit not shown. Periodically, or under the control of commands received over loop 120, a diagnostic test is performed using source 100. Source 100 is momentarily pulsed on thereby illuminating sensor 70A in the region between plates 104. Switch 126 couples plates 104 to capacitance measurement/ compensation circuitry 114. The operation of switch 126 will be explained below in more detail. The circuitry 114 monitors the capacitance between plates 104. FIG. 4 is a graph showing capacitance versus time of the capacitance between plates 104. Note that when source 100 is turned on, the capacitance goes through a step increase which remains relatively constant until light source 100 is turned off. When source 100 is turned off the capacitance similarly drops in the step response. It is believed that the amplitude of the step response 128 is proportional to the number of gas molecules present between plates 104.

Microprocessor 112 monitors the size of step 128. If the size of step 128 is reasonably small, the pressure measurement can be compensated. For example, the pressure measurement can be slightly reduced based upon the size of step 128. This reduction may be a linear reduction, a polynomial reduction or some other type of curve used to compensate for the loss of vacuum in sensor 70A. Additionally, if the amplitude of step 128 is greater than a predetermined limit, an alarm condition can be initiated which indicates that sensor 70A or 70B has failed. This alarm condition is transmitted by interface 110 over loop 120.

Switch 126 is used in accordance with another embodiment of the present invention. It is desirable to verify that pressure sensors 70A and 70B are properly responding to changes in pressure. Switch 126 is used to perturb the pressure sensor by applying a step voltage input generated by voltage source 130. The step voltage change is applied to the sensor and the response of the sensor is monitored. The effective pressure due to an applied voltage is given by the equation:

$$\Delta P = \frac{1}{2} \epsilon_0 \frac{V^2}{G^2} \qquad \text{Equation 1}$$

In the equation, $\Delta P$ is the effective pressure change due to an applied voltage V. G is the nominal gap between plates 104. Epsilon ($\epsilon_o$) is the dielectric constant of the gap. In one embodiment, G is equal to about 0.5 microns. If a step voltage input of 5 volts is applied, to the effective change in pressure is about 0.064 PSI.

The present invention includes using the above described technique in a number of different ways in order to obtain diagnostic information for the pressure sensor. In one embodiment, a known voltage is applied to plates 104 and the change in capacitance is monitored due to the pressure change. This is achieved by positioning switch 126 momentarily in contact with voltage source 130 and then reconnecting circuitry 114 to plates 104 under the control of microprocessor 112. A functioning sensor will respond with a predetermined offset. Note that if the measurement circuitry applies a DC offset voltage to a sensor 70A, there may be a limit on the amount of additional DC offset voltage which can be applied.

Figure 5:
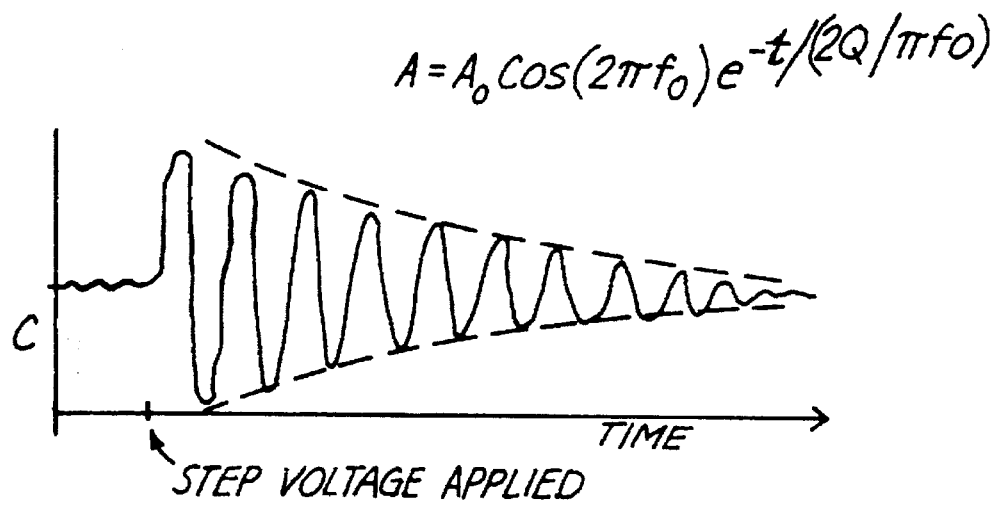
FIG. 5 is a graph showing capacitance versus time in accordance with another embodiment.

In another embodiment, a voltage impulse is momentarily applied to plates 104. This is achieved by rapidly switching switch 126. This causes plates 104 to ring as illustrated in FIG. 5 which is a graph of capacitance versus time. The output signal carries both amplitude and dynamic information in the form of the frequency of the ringing signal and the decay of the signal. The initial amplitude of the signal gives the same information as described above. The frequency of the ringing can be measured to yield additional information. The decay rate information is indicative of the process fluid environment. For example, the decay rate can be used to provide an alarm related to a plugged or encrusted transmitter. The ringing is given by the equation:

$$A = A_o \cos(2\pi f_o) e^{-t/(2Q/\pi f_o)} \qquad \text{Equation 2}$$

Where $A_o$ is the initial amplitude, $f_o$ is the resonant frequency and Q is the Q of the sensor. In this embodiment, microprocessor 112 is capable of performing signal processing on the signal received from circuitry 114, whereby the frequency, amplitude and decay rate of the signal are determined. This technique requires a relatively high band width circuit in order to determine the frequency response. This technique may be used with sensors which are vacuum filled or which contain a non-vacuum reference level such as in an oil filled sensor or an inert gas.

Based upon the initial amplitude, frequency and Q, the sensor can be compensated to thereby extend its useful life. Additionally, if any of these parameters exceed predetermined limits, an alarm condition can be initiated causing an alarm signal to be transmitted over loop 120.

Although the present invention has been described with reference to preferred embodiments, workers skilled in the art will recognize that changes may be made in form and detail without departing from the spirit and scope of the invention. For example, although the invention has been described in conjunction with capacitive base sensors, the invention may be employed with other sensing techniques. Further, the techniques described herein may be employed with sensors made in any configuration and using any other material which has been developed or may be developed in the future. The electrical implementation is just one embodiment and the invention may be implemented in any appropriate embodiment including any combination of digital and analog circuitry. Any type of diagnostic input may be used, any type of radiation source, pulse input, switching technique or other input may be employed. As used herein, any input such as radiation or electrical to the sensor is a "perturbation input."

What is claimed is:

1. A transmitter adapted to couple to a two-wire loop in a process control system, comprising:

a pressure sensor comprising:

a pressure responsive structure for receiving a process pressure;

a capacitor having at least one capacitor plate coupled to the pressure responsive structure and having a capacitance related to the process pressure;

measurement circuitry coupled to the capacitor providing a pressure output related to the capacitance;

input circuitry for completely powering the transmitter from a loop current received from the two-wire loop and output circuitry for transmitting the pressure output on the two-wire loop; and diagnostic circuitry coupled to the pressure sensor and powered solely from the loop current received by the input and output circuitry, the diagnostic circuitry providing a perturbation input to the pressure sensor and providing a sensor diagnostic output based upon a change in pressure output caused by a change in capacitance in response to the perturbation input.

2. The transmitter of claim 1 wherein the diagnostic circuitry includes a radiation emitting device and the perturbation input comprises electromagnetic radiation directed at the pressure responsive structure generated by the radiation emitting device.

3. The transmitter of claim 2 wherein the radiation emitting devices comprises a light emitting diode.

4. The transmitter of claim 1 wherein the perturbation input comprises an electrical input signal which is powered solely from the loop current received from the two-wire loop and is applied to the capacitor.

5. The transmitter of claim 4 wherein the electrical input signal comprises a voltage.

6. The transmitter of claim 1 wherein the diagnostic circuitry monitors a change in pressure output to provide the diagnostic output.

7. The transmitter of claim 1 wherein the perturbation input comprises an impulse and the diagnostic circuitry provides the diagnostic output based upon a ringing frequency in the pressure output.

8. The transmitter of claim 1 wherein the perturbation input comprises an impulse and the diagnostic circuitry provides the diagnostic output based upon a decay rate in the pressure output.

9. The apparatus of claim 1 wherein the perturbation input comprises an impulse and the diagnostic circuitry provides the diagnostic output based upon the amplitude of the pressure output.

10. The apparatus of claim 1 wherein the measurement circuitry compensates the pressure output based upon the sensor diagnostic output.

11. The apparatus of claim 1 wherein the sensor diagnostic output comprises an alarm output provided to the input and output circuitry for transmission over the process control loop.

12. The apparatus of claim 1 wherein the pressure sensor includes a cavity containing a vacuum reference.

13. The apparatus of claim 1 wherein the pressure sensor includes a cavity containing a non-vacuum reference.

14. The apparatus of claim 13 wherein the non-vacuum reference comprises an inert gas.

15. The apparatus of claim 1 wherein the pressure sensor is formed of sapphire.

16. The apparatus of claim 1 wherein the input and output circuitry provides an analog current level output on the process control loop.

17. The apparatus of claim 1 wherein the input and output circuitry provides a digital output on the process control loop.

* * * * *

UNITED STATES PATENT AND TRADEMARK OFFICE
CERTIFICATE OF CORRECTION

PATENT NO. : 5,665,899
DATED : September 9, 1997
INVENTOR(S) : Charles R. Willcox It is certified that error appears in the above-identified patent and that said Letters Patent is hereby corrected as shown below:

On the title page,
Under [56] Reference Cited, Page 2, OTHER PUBLICATIONS, change ""Small sensitive pressure transducer for use at a low temperature", W. Griffioen and G. Frossati, Rev. Sci. Instrum., Vol. 56, No. 6, June 1985, pp. 1236-1238." to --"Small sensitive pressure transducer for use at low temperatures", W. Griffioen and G. Frossati, Rev. Sci. Instrum., Vol. 56, No. 6, June 1985, pp. 1236-1238.-- change ""Low-Temperature Preparation of Silicon/Silicon Interfaces by the Silicon-to-Silicon Bonding Method", S. Bengtsson and O. Engström, J. Electrochem. Soc., Vol. 137, No. 7, July 1990, pp. 2297-2303." to --"Low-Temperature Preparation of Silicon/Silicon Interfaces by the Silicon-to-Silicon Direct Bonding Method", S. Bengtsson and O. Engström, J. Electrochem. Soc., Vol. 137, No. 7, July 1990, pp. 2297-2303.--

Signed and Sealed this

Tenth Day of November 1998

*Attest:*

BRUCE LEHMAN

*Attesting Officer*  Commissioner of Patents and Trademarks